(No Model.)

J. W. REGAN & C. A. NEUERT.
TRAP FOR KITCHEN SINKS.

No. 434,680. Patented Aug. 19, 1890.

WITNESSES.
J. Henry Marsh.
R. E. Brown

INVENTOR
J. W. Regan.
C. A. Neuert.
by Wight, Brown & Crossley,
Attys.

THE NORRIS PETERS CO., PHOTO-LITHO., WASHINGTON, D. C.

UNITED STATES PATENT OFFICE.

JOHN W. REGAN AND CHARLES A. NEUERT, OF BOSTON, MASSACHUSETTS.

TRAP FOR KITCHEN-SINKS.

SPECIFICATION forming part of Letters Patent No. 434,680, dated August 19, 1890.

Application filed November 25, 1889. Serial No. 331,465. (No model.)

*To all whom it may concern:*

Be it known that we, JOHN W. REGAN and CHARLES A. NEUERT, of Boston, in the county of Suffolk and State of Massachusetts, have invented certain new and useful Improvements in Traps for Kitchen-Sinks, of which the following is a specification.

Our invention is particularly applicable to kitchen-sinks, and is designed to serve as a strainer for the water poured into the sink when the latter is being used, and to afford a very simple and efficient means for closing the trap at night and at other times when the sink is not being used, so as to prevent the escape of sewer-gas into the house.

The invention comprises a trap consisting of a receptacle for the water and sewerage matter, which receptacle may have the form of a funnel, or be otherwise shaped, having in its mouth means for the reception of a screw-bolt, and provided on its upper edge with a packing-ring combined with a lid or cover adapted to fit over the top of the receptacle and be screwed down upon the packing-ring, or be slightly raised above the same, so as to permit the water to flow between the lid and the top of the receptacle, the lid being raised and lowered by means of the screw-bolt operating in the cross-bar or other means in the mouth of the receptacle. Provision is also made whereby metallic packing may be employed and a perfectly-tight joint between the cover and receptacle is secured, and, again, the cover is so seated upon the receptacle as to make the surface of the former even with that of the latter.

Reference is to be had to the annexed drawings and the letters of reference marked thereon, forming a part of this specification, the same letters designating the same parts or features, as the case may be, wherever they occur.

Figure 1:
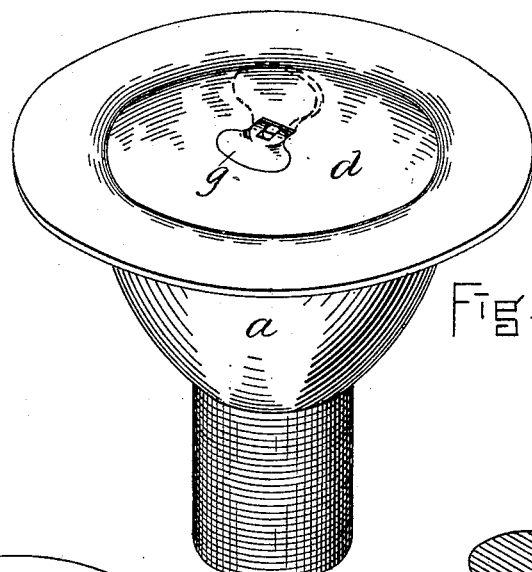
Figure 3:
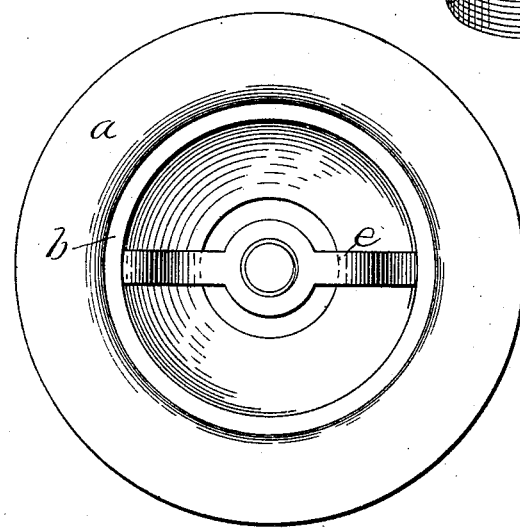
Figure 2:
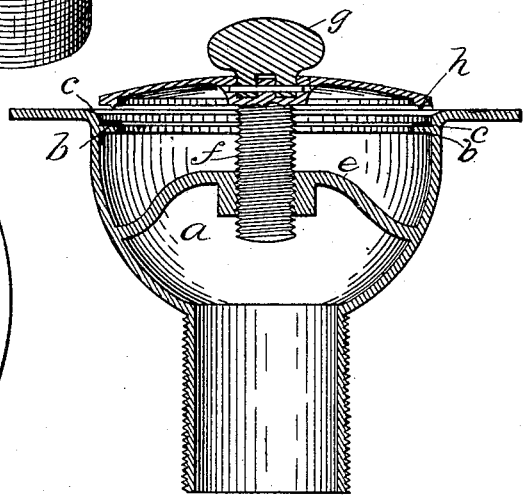

In the drawings, Figure 1 is a perspective view of the invention, the lid being shown as screwed down tightly upon the water-receptacle. Fig. 2 is a vertical central section of the same, showing the lid slightly raised from the top of the receptacle as it may be when the sink is being used. Fig. 3 is a plan view with the lid removed.

*a* designates the receptacle for the water and sewage, which receptacle is here shown as provided with a flaring or funnel-shaped mouth, though it will appear obvious that it may be otherwise formed. The upper edge *b* of the receptacle *a* is provided with a packing washer or ring *c*, which may be of soft metal or other suitable material. As herein shown, the ring *c* is arranged in an offset or depression formed in the edge *b*, which depression is of sufficient depth to receive the edge of the lid or cover *d* when the latter is screwed down thereon, in such manner that the upper surface of the lid will be flush with the surrounding surface of the receptacle.

In the mouth of the receptacle *a* there is a cross-bar *e*, which is provided with a screw-threaded hole into which a screw-bolt *f* is tapped, said bolt being extended through and connected with the lid *d*, so that the latter may be raised and lowered thereby. The bolt *f* is provided at its upper end with a hinged thumb-piece *g*, which is fitted to lie in a recess formed in the lid when not needed for use, or to be raised to the dotted-line position, Fig. 2, when wanted in order to raise and lower the lid. The edge of the lid over the ring *c* is provided with a sharp-edged rib *h*, that is adapted to sink into the packing-ring *c*, the better to form a tight joint between the edge of the lid and the edge *b* of the receptacle *a*. It is obvious that the edge of the lid might be provided with the packing-ring *c*, and the sharp-edged rib *h* be formed on the edge *b* of the receptacle.

When it is desired that water may flow into the trap, the lid or cover *d* will be raised sufficiently high for the purpose, leaving the space between the upper edge of the receptacle and the edge of the lid sufficiently narrow, at the same time to serve as a strainer for the refuse poured into the sink; and when the latter is not in use, as in the night-time, the lid will be screwed down tightly on the packing-ring *c*, and so prevent the possibility of the escape of sewer-gas into the room.

The invention is at once simple in construction, economical of manufacture, and thoroughly efficient for the purposes for which it is intended.

Having thus explained the nature of our invention and described a way in which the same may be constructed and used, we declare that what we claim is—

A trap for kitchen-sinks, &c., consisting of a receptacle, a screw-bolt support in the mouth of the receptacle, the said receptacle being provided in its upper edge with an offset, a packing-ring in the said offset, a lid adapted to fit in the said offset upon the said packing-ring, and the upper surface of the lid being flush with the surrounding surface of the receptacle, and a bolt connected with the lid and tapped into the support in the mouth of the receptacle, as set forth.

In testimony whereof we have signed our names to this specification, in the presence of two subscribing witnesses, this 13th day of November, A. D. 1889.

JOHN W. REGAN.
CHARLES A. NEUERT.

Witnesses:
ARTHUR W. CROSSLEY,
KATHERINE E. BROWN.